(12) United States Patent
DeBrabant (10) Patent No.: US 6,880,890 B1
(45) Date of Patent: Apr. 19, 2005

(54) MULTI-POSITION HEADREST FOR VEHICLE SEAT

(75) Inventor: Sandra M. DeBrabant, Warren, MI (US)

(73) Assignee: Fisher Dynamics Corporation, St. Clair Shores, MI (US)

( * ) Notice: Subject to any disclaimer, the term of this patent is extended or adjusted under 35 U.S.C. 154(b) by 0 days.

(21) Appl. No.: 10/773,116

(22) Filed: Feb. 5, 2004

(51) Int. Cl.[7] .............................................. A47C 7/38
(52) U.S. Cl. .................................................... 297/408
(58) Field of Search ........................................ 297/408

(56) References Cited

U.S. PATENT DOCUMENTS

| | | | |
|---|---|---|---|
| 1,394,913 A | * 10/1921 | Laraia ..................... 297/408 X |
| 3,506,306 A | * 4/1970 | Herzer et al. ............... 297/408 |
| 3,929,374 A | 12/1975 | Hogan et al. |
| 4,040,661 A | 8/1977 | Hogan et al. |
| 4,304,439 A | * 12/1981 | Terada et al. ........... 297/408 X |
| 4,351,563 A | * 9/1982 | Hattori ........................ 297/408 |
| 4,380,352 A | 4/1983 | Diffrient |
| 4,674,797 A | * 6/1987 | Tateyama ................... 297/408 |
| 4,682,817 A | * 7/1987 | Freber ........................ 297/408 |
| 4,685,730 A | 8/1987 | Linguanotto |
| 4,844,544 A | 7/1989 | Ochiai |
| 5,026,120 A | * 6/1991 | Takeda et al. .............. 297/408 |
| 5,681,079 A | 10/1997 | Robinson |
| 5,823,619 A | 10/1998 | Heilig et al. |
| 5,882,071 A | 3/1999 | Fohl |
| 5,918,940 A | 7/1999 | Wakamatsu et al. |
| 5,927,804 A | 7/1999 | Cuevas |
| 6,022,074 A | 2/2000 | Swedenklef |
| 6,024,405 A | 2/2000 | MacAndrew et al. |
| 6,024,406 A | 2/2000 | Charras et al. |
| 6,042,190 A | 3/2000 | Mathe et al. |
| 6,047,444 A | 4/2000 | Braun |
| 6,135,561 A | 10/2000 | Kruger et al. |
| 6,179,379 B1 | 1/2001 | Andersson |
| 6,192,565 B1 | 2/2001 | Tame |
| 6,209,955 B1 | 4/2001 | Seibold |
| 6,273,511 B1 | 8/2001 | Wieclawski |
| 6,296,306 B1 | 10/2001 | Specht et al. |
| 6,364,414 B1 | 4/2002 | Specht |
| 6,402,238 B1 | 6/2002 | Bigi et al. |
| 6,409,263 B1 | 6/2002 | Seibold |
| 6,416,127 B1 | 7/2002 | Galbreath, Jr. et al. |
| 6,471,292 B1 | 10/2002 | Sundgren et al. |
| 6,485,096 B1 | 11/2002 | Azar et al. |
| 6,523,893 B1 | 2/2003 | Kamper et al. |
| 6,550,865 B1 | 4/2003 | Cho |
| 6,554,356 B1 | 4/2003 | Crose |
| 6,565,150 B1 | 5/2003 | Fischer et al. |
| 6,604,788 B1 | 8/2003 | Humer |
| 6,612,653 B1 | 9/2003 | Takata |
| 6,631,949 B1 | 10/2003 | Humer et al. |
| 6,631,955 B1 | 10/2003 | Humer et al. |
| 6,688,697 B1 | * 2/2004 | Baumann et al. ....... 297/408 X |
| 2004/0160106 A1 | * 8/2004 | Tomimatsu ................. 297/408 |

* cited by examiner

*Primary Examiner*—Rodney B. White
(74) *Attorney, Agent, or Firm*—Harness, Dickey & Pierce, P.L.C.

(57) ABSTRACT

A headrest assembly includes a first housing, a second housing rotatably supported by the first housing, and an adjustment mechanism adapted to selectively position the second housing relative to the first housing. The adjustment mechanism includes a cross member rotatably supported by the first housing and a locking mechanism operable between a locked position and an unlocked position. The locking mechanism engages the second housing in the locked position to lock the second housing in one of a plurality of positions relative to the first housing and disengages the second housing in the unlocked position to allow the second housing to rotate relative to the first housing.

26 Claims, 8 Drawing Sheets

MULTI-POSITION HEADREST FOR VEHICLE SEAT

FIELD OF THE INVENTION

The present invention relates to seat assemblies, and more particularly, to an improved headrest assembly for use with a seat assembly.

BACKGROUND OF THE INVENTION

In vehicle design, occupant safety is becoming increasingly important. To that end, vehicle safety systems and vehicle structure play a significant role. As a general proposition, when a moving vehicle is abruptly stopped (i.e., from contact with a stationary object or another vehicle), the forward momentum and associated forces are transferred to the vehicle occupants by way of vehicle structure and associated components. To minimize the effects of such forces on vehicle occupants, vehicle safety systems work in conjunction with energy management devices to transfer energy generated by the vehicle impact generally to the structure of the vehicle and away from the vehicle occupants.

Safety systems commonly work in conjunction with vehicle structure to transfer impact forces and divert the associated energy away from the vehicle occupants and into the vehicle structure. Modern vehicle safety systems commonly include a variety of energy management devices such as seatbelts and airbags to help protect a passenger in the event of an impact or accident. Such systems are typically designed to work together with sensors and other structural elements such as door beams, side sill sections, and body panels to improve overall vehicle safety and provide the best possible protection for vehicle occupants. More particularly, such systems act to gradually decelerate the occupants with the vehicle structure to dissipate the forces away from the occupants and into the vehicle structure.

Such impact forces are commonly absorbed by the vehicle structure through deformation of steel and other structural components. In an effort to effectively transmit impact forces to the vehicle structure, vehicle safety systems are implemented to safely transmit the force from a moving occupant (i.e., an occupant moving forward relative to a vehicle structure) to the vehicle structure via an energy management device such as a seatbelt or an airbag. More particularly, the forces associated with an occupant moving relative to the vehicle are safely and controllably transmitted to the vehicle structure via a seatbelt or an airbag such that the structure, as opposed to the occupant, can manage the energy.

Energy management devices, such as airbags and seatbelts, are commonly designed to be used in conjunction with one another to transfer impact forces to the associated vehicle structure. Airbags are generally operable to transmit a force received by a moving occupant to the vehicle structure, while seatbelts are operable to transmit similar forces to the vehicle structure via a vehicle floor pan or vehicle seat, depending on the particular application. As can be appreciated, such vehicle seats are operable to receive the impact force from one of, or both, the airbag and seatbelt to dissipate energy safely to the vehicle structure, thereby protecting the vehicle occupants.

In addition to the aforementioned safety systems, vehicle seats also play a significant role in occupant protection. As can be appreciated, vehicle seats are commonly designed to work with safety systems and energy management devices to divert impact forces into the vehicle structure and away from vehicle occupants.

Conventional seat assemblies commonly include a seatback pivotably supported by a seat bottom and a recliner mechanism. The recliner mechanism is disposed between the seatback and the seat bottom and is operable to selectively position the seatback relative to the seat bottom. In this manner, the ability of the seatback to absorb and transfer forces to a vehicle structure includes at least two components. First, the overall strength of the seatback structure must be of sufficient rigidity to receive a force from an occupant and transfer the associated force to the vehicle structure, and second, the recliner mechanism must be able to transmit such forces from the seatback to the seat bottom and associated vehicle structure. In this regard, interaction between the occupant and the seatback plays a role in energy management during an impact event.

To ensure adequate engagement with a vehicle occupant, conventional vehicle seats commonly include a headrest assembly. Typical headrest assemblies are disposed at an opposite end of the seatback from the recliner mechanism and are operable to receive an occupant's head during normal driving conditions as well as during an impact event. Such headrest assemblies typically provide the occupant with the ability to adjust the position of the headrest relative to the seatback so as to provide each individual occupant with a desirable and comfortable headrest position. As can be appreciated, such an adjustment provides the occupant with the ability to adjust the headrest so as to increase the comfort of the seat assembly under normal driving conditions both axially (i.e., up and down) and in a fore-aft direction. In addition, the adjustment provides the occupant with the ability to adjust the headrest in response to rotation or reclining of the seatback relative to the seat bottom.

Forward adjustment of the headrest upon rearward recline of the seatback relative to the seat bottom helps to ensure that the occupant's head is in close proximity to the headrest at all times. Specifically, under normal driving conditions, positioning of the headrest in such a fashion helps support the occupant's head, thereby providing the occupant with increased comfort. Under an impact event, positioning the headrest in proximity to the occupant's head encourages the occupant to engage the headrest shortly after the initial impact, thereby quickly and efficiently transmitting the impact force from the occupant into the vehicle seat. As previously discussed, such energy management allows the seat assembly and associated vehicle structure to dissipate the impact force and protect the occupant.

SUMMARY OF THE INVENTION

Accordingly, a headrest assembly is provided and includes a first housing, a second housing rotatably supported by the first housing, and an adjustment mechanism adapted to selectively position the second housing relative to the first housing. The adjustment mechanism includes a cross member rotatably supported by the first housing and a locking mechanism operable between a locked position and an unlocked position. The locking mechanism engages the second housing in the locked position to lock the second housing in one of a plurality of positions relative to the first housing and disengages the second housing in the unlocked position to allow the second housing to rotate relative to the first housing.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

With reference to the figures, a headrest assembly 10 is provided and includes an upper housing 12, a lower housing 14, an adjustment mechanism 16, and a lock mechanism 18. The adjustment mechanism 16 and lock mechanism 18 cooperate to selectively position the upper housing 12 with respect to the lower housing 14, as will be discussed further below.

Figure 1:
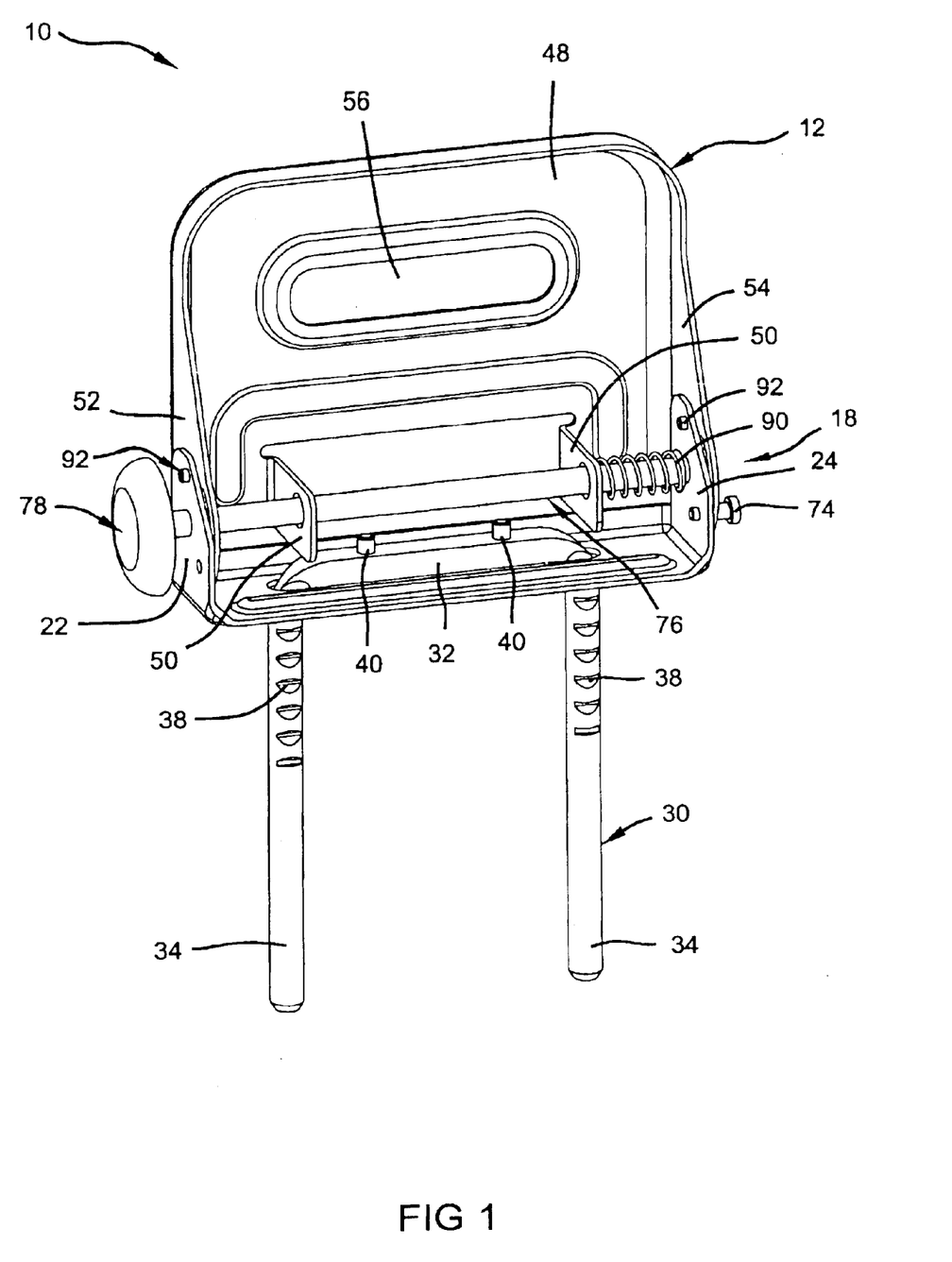
FIG. 1 is a perspective view of a headrest assembly in accordance with the principals of the present invention.
Figure 2:
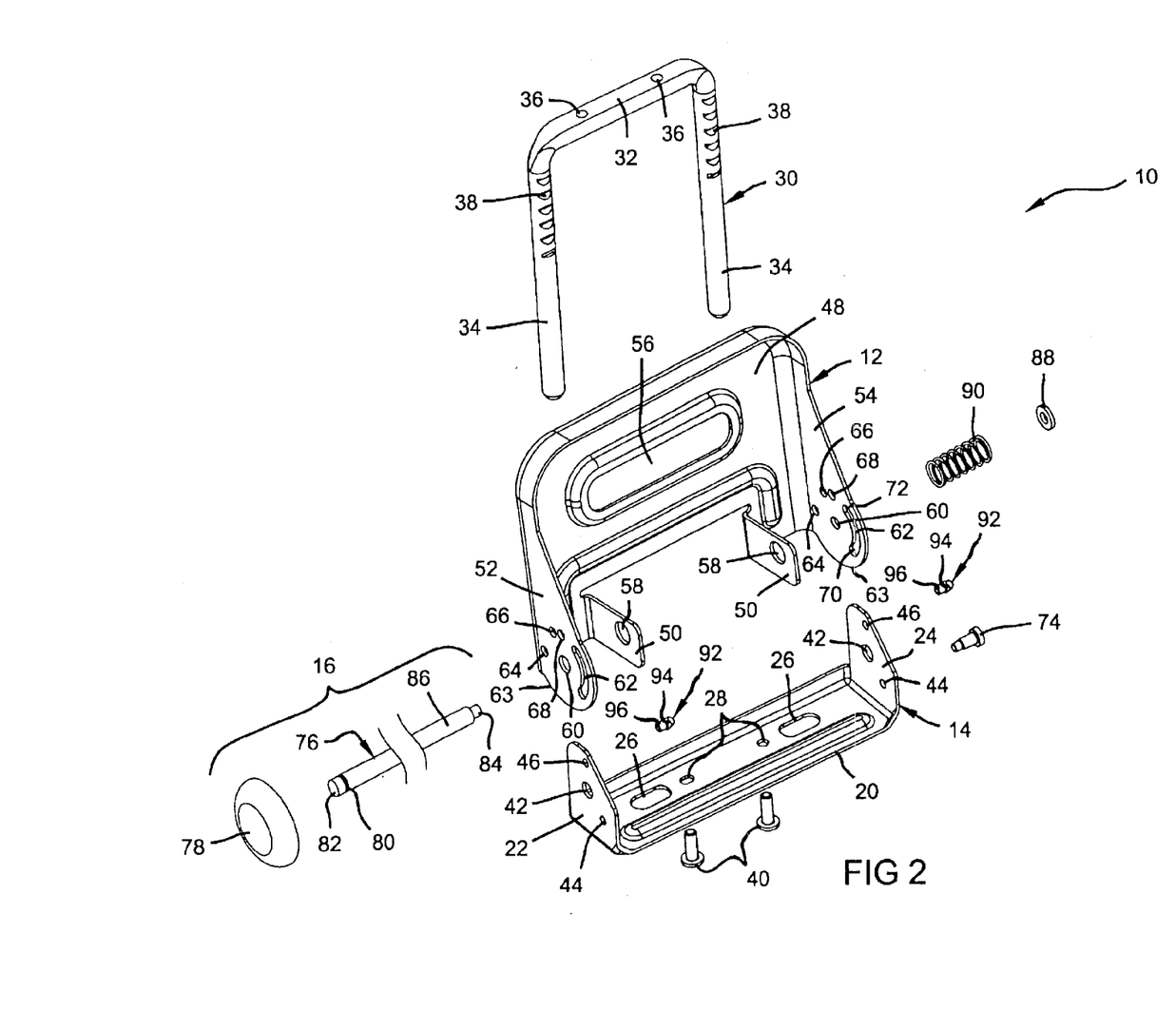
FIG. 2 is an exploded view of the headrest assembly of FIG. 1.

With particular reference to FIGS. 1 and 2, the lower housing 14 is shown to include a main body 20 and a first and second flange 22, 24. The main body 20 extends between the first and second flanges 22, 24 and includes a pair of clearance apertures 26 and a pair of attachment apertures 28. The clearance apertures 26 and attachment apertures 28 cooperate to fixedly attach the lower housing 14 to an adjustment bar 30, as best shown in FIG. 1.

The adjustment bar 30 includes a main body 32 and a pair of legs 34 integrally formed with the main body 32. In addition, the adjustment bar 30 includes a pair of attachment apertures 36 and a plurality of notches 38, as best shown in FIG. 2. The legs 34 are received by the clearance apertures 26 of the lower housing 14 such that the attachment apertures 36 align with the attachment apertures 28 of the lower housing 14. A pair of rivets 40 are received through attachment apertures 36 of the adjustment bar 30 and through attachment apertures 28 of the lower housing 14 to fixedly attach the lower housing 14 to the adjustment bar 30. In this manner, the legs 34 of the adjustment bar 30 extend from the main body 20 of the lower housing 14, as best shown in FIG. 1.

The first and second flanges 22, 24 extend from the main body 20 of the lower housing 14 in generally opposite direction from the legs 34 of the adjustment bar 30. Each of the first and second flanges 22, 24 includes a central attachment aperture 42, a post aperture 44, and a pin aperture 46. The central attachment aperture 42 is formed generally between the post aperture 44 and the pin aperture 46, as best shown in FIG. 2. The central attachment aperture 42 receives the adjustment mechanism 16 such that the upper housing 12 rotates relative to the lower housing 14 about the central attachment aperture 42. The post aperture 44 and pin aperture 46 function with the lock mechanism 18 to selectively position the upper housing 12 relative to the lower housing 14, as will be discussed further below.

The upper housing 12 is rotatably supported by the lower housing 14 and includes a main body 48, a pair of support arms 50, and a first and second flange 52, 54. The main body 48 extends generally between the first and second flanges 52, 54 and includes an attachment aperture 56, as best shown in FIG. 2. The support arms 50 each include an attachment aperture 58, formed generally between the first and second flanges 52, 54 and below the attachment aperture 56.

Each of the first and second flanges 52, 54 includes a central attachment aperture 60, a slot 62, and first, second and third pin apertures 64, 66, 68. The central attachment aperture 60 of the first and second flanges 52, 54 co-aligns with the central attachment apertures 42 of the lower housing 14 such that the upper housing 12 rotates relative to the lower housing 14 about central attachment aperture 60 of the upper housing 12 and central attachment apertures 42 of the lower housing 14.

Figure 3:
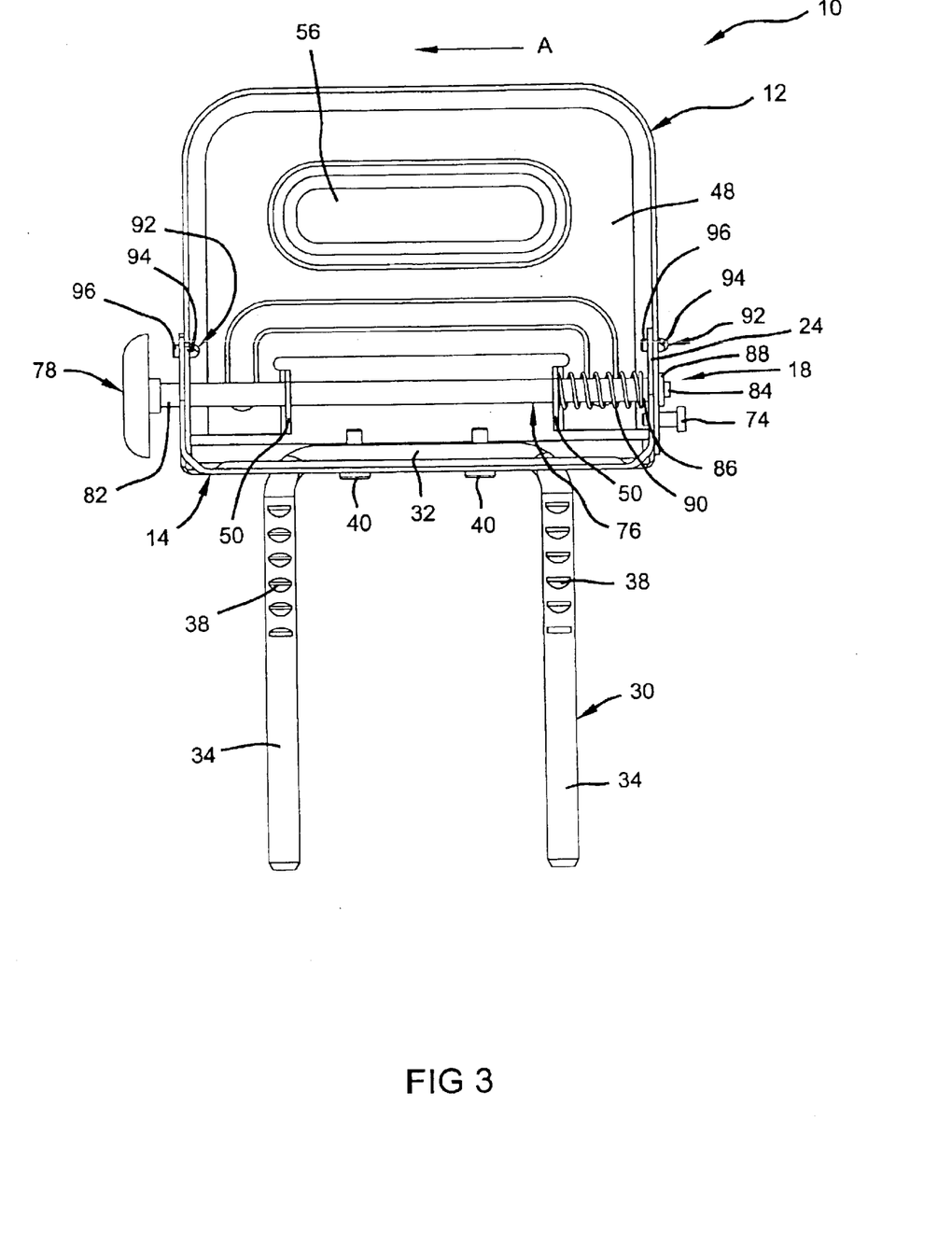
FIG. 3 is a front view of the headrest assembly of FIG. 1 in a locked position with part of a housing removed to show internal components.

The slot 62 generally defines the range of motion for the upper housing 12 relative to the lower housing 14 and includes a generally arcuate shape, as best shown in FIG. 2. The slot 62 includes a first end 70 disposed proximate a bottom surface 63 of flanges 52, 54 and a second end 72 disposed generally proximate to the third pin aperture 68, as best shown in FIG. 2. A post 74 is fixedly attached to one of the flanges 22, 24 of the lower housing 14 at the post aperture 44 and extends through the slot 62, as best shown in FIG. 3. Specifically, the post 74 is slidably received by the slot 62 and is moveable generally between the first and second ends 70, 72.

Figure 5A:
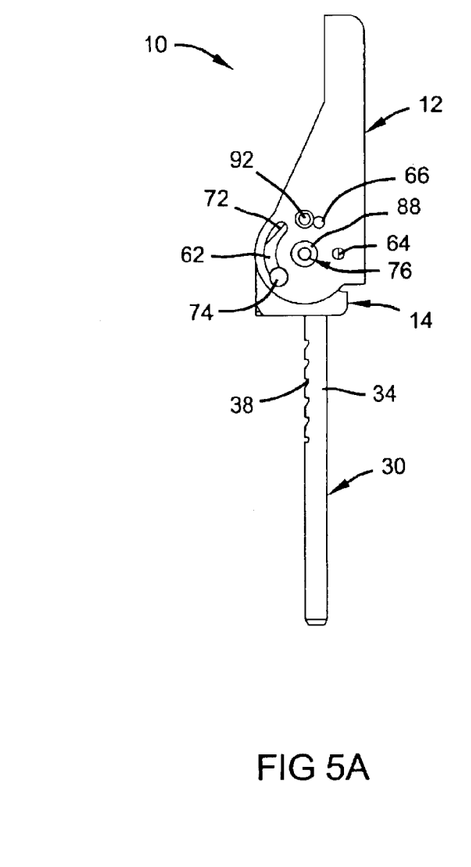
FIG. 5a is a side view of the headrest assembly of FIG. 1 in a first position.
Figure 5B:
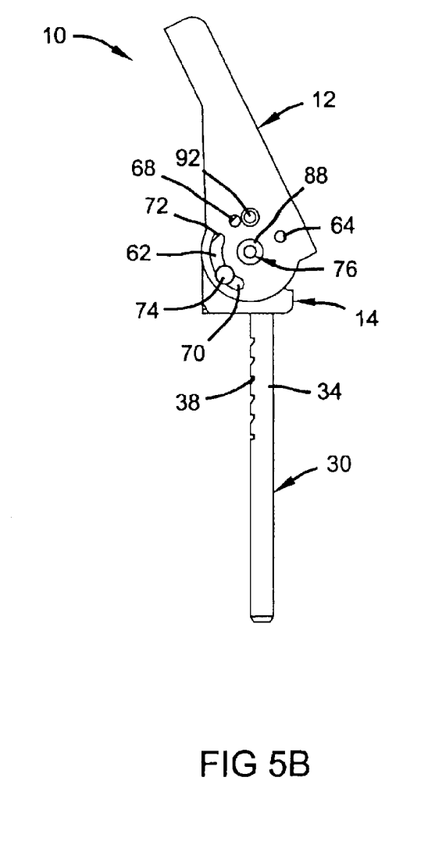
FIG. 5b is a side view of the headrest assembly of FIG. 1 in a second position.
Figure 5C:
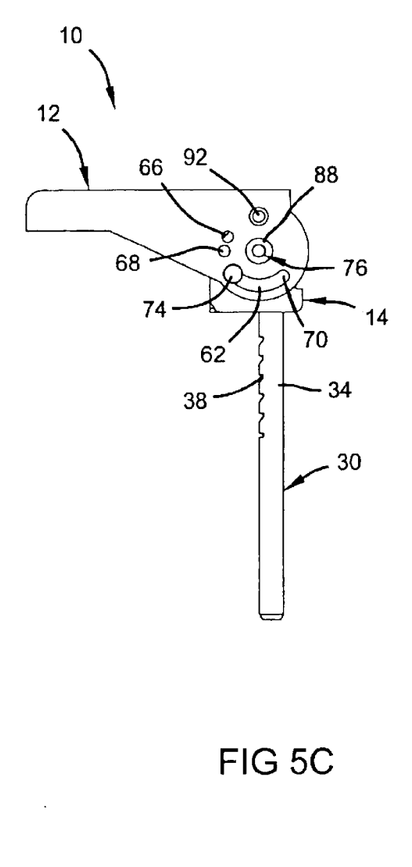
FIG. 5c is a side view of the headrest assembly of FIG. 1 in a third position.

Movement of the upper housing 12 relative to the lower housing 14 is generally governed by movement of the post 74 within the slot 62. Specifically, when the upper housing 12 is in a fully upright position relative the lower housing 14, the post 74 is generally proximate to the first end 70 of the slot 62, as best shown in FIG. 5A. As the upper housing 12 is rotated relative to the lower housing 14, the post 74 begins to travel along the generally arcuate shape of the slot 62, as best shown in FIG. 5B. Once the upper housing 12 has been sufficiently rotated relative to the lower housing 14 such that the upper housing 12 is in the fully articulated or dumped position, the post 74 will engage the second end 72 of slot 62 and restrict further rotation of the upper housing 12 relative to the lower housing 14, as shown in FIG. 5C.

With particular reference to FIG. 1, the adjustment mechanism 16 is shown to include a cross member 76 and an actuation handle 78. The cross member 76 is a generally elongate cylindrical member having an annular groove 80 formed at a first end 82, and an extension 84 formed at a second end 86. The cross member 76 is rotatably received through central attachment apertures 42 of the lower housing 14, central attachment apertures 60, of the upper housing 12, and attachment apertures 58 of the support arms 50, as best seen in FIG. 1. In this manner, the upper housing 12 rotates relative to the lower housing 14 generally about an outer diameter of the cross member 76.

The cross member 76 is rotatably attached to the upper housing 12, generally at the second flange 54 by a washer 88. The washer 88 is received by the extension 84 to prevent the cross member 76 from backing out of the central attachment aperture 60 of the second flange 54. While a washer 88 is described, it should be understood that any other suitable means of rotatably attaching the cross member 76 to the upper housing 12, such as by a bearing or slot, is anticipated and should be considered as part of the present invention. Furthermore, while the cross member 76 is described as being rotatably attached to the upper housing 12, it should be understood that the cross member 76 could alternatively be fixedly attached to the upper housing 12 such that rotation of the cross member 76 causes concurrent rotation of the upper housing 12, as will be discussed further below.

The first end 82 of the cross member 76 fixedly receives the actuation handle 78 such that a force applied to the actuation handle 78 is applied to the cross member 76. More particularly, the actuation handle 78 is received by the first end 82 of the cross member 76 generally by the annular groove 80 such that the actuation handle 78 snaps into the annular groove 80 and becomes fixedly attached to the cross member 76. In this manner, a force applied to the actuation handle 78 is concurrently applied to the cross member 76, as will be discussed further below.

The lock mechanism 18, is operable to lock the upper housing 12 in one of a plurality of positions relative to the lower housing 14 and includes a spring 90 and a pair of lock pins 92. The spring 90 is received by the cross member 76 and is disposed generally between one of the support arms 50 and the second flange 24 of the lower housing 14, as best shown in FIG. 3. The spring 90 serves to bias the upper housing 12 generally in the direction labeled A in FIG. 3 due to the interaction between the spring 90, the support arm 50, and the second flange 24 of the lower housing 14.

Each of the lock pins includes a tapered surface 94, and a generally cylindrical surface 96, as best shown in FIG. 2. The cylindrical surfaces 96 are received by the pin apertures 46 of the lower housing 14 such that each of the lock pins 92 are fixed to the lower housing 14. As best shown in FIG. 3, the tapered surfaces 94 of each of the lock pins 92 extend from the first and second flanges 22, 24 in a direction generally opposite to that of the labeled direction A. As such, each of the lock pins 92 are operable to engage the first, second and third pin apertures 64, 66, 68 of the upper housing 12 to lock the upper housing 12 in one of a plurality of positions relative to the lower housing 14, as will be discussed further below.

With particular reference to FIGS. 3–4 and FIGS. 5A–5C, the operation of the headrest assembly 10 will be described in detail. When the upper housing 12 is in the fully upright position relative to the lower housing 14, as shown in FIG. 5A, both of the lock pins 92 engage the third pin apertures 68 of the upper housing plate 12 and the post 74 is disposed generally at the first end 70 of slot 62. As can be appreciated, such a relationship holds the upper housing 12 relative to the lower housing 14 due to the reaction of the spring 90 against the upper housing plate 12 and lower housing plate 14. In other words, the spring 90 serves to maintain the upper housing plate 12 in engagement with the lower housing plate 14 such that the pins 92 maintain engagement with the third pin apertures 68.

Figure 4:
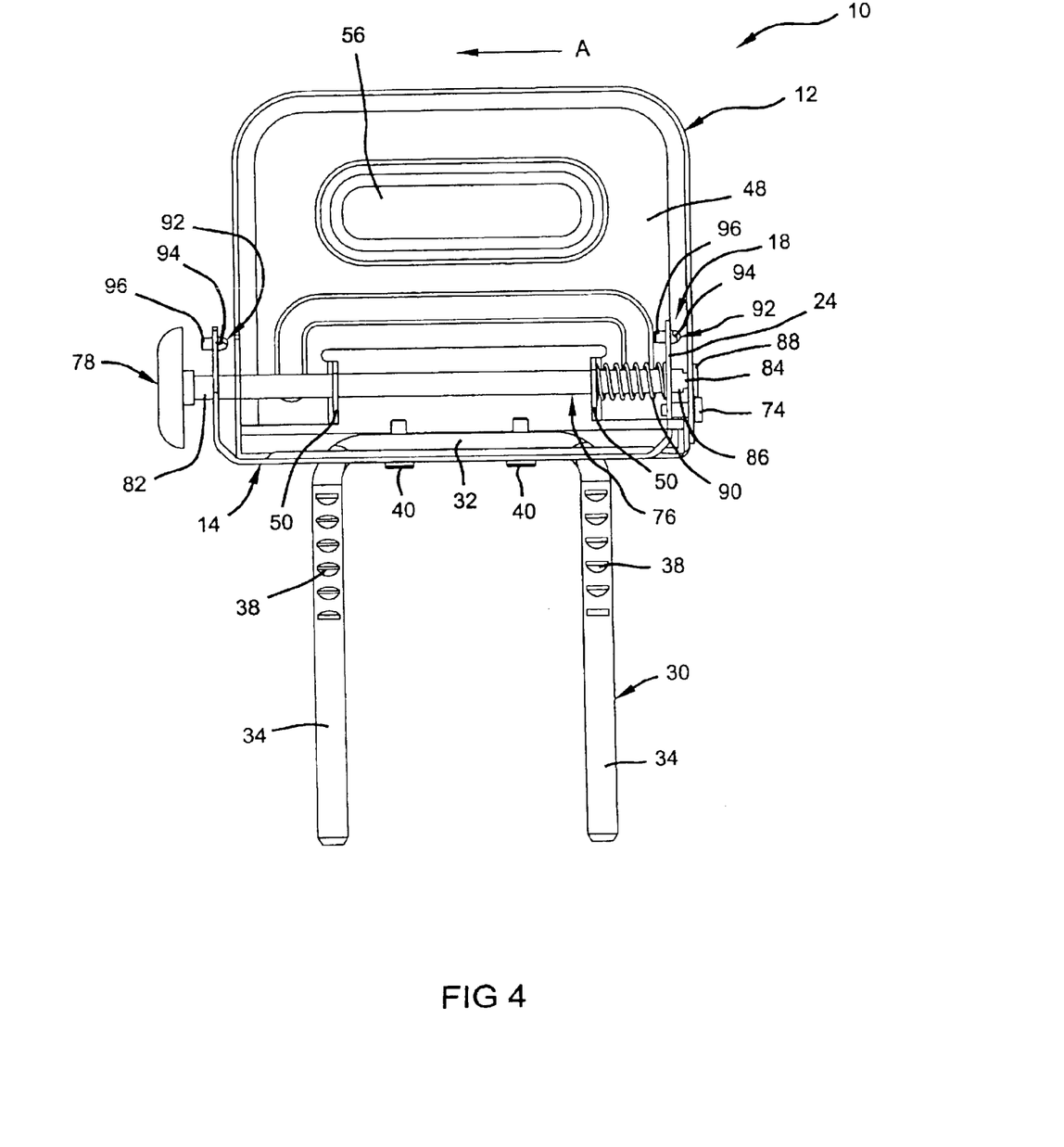
FIG. 4 is a front view of the headrest assembly of FIG. 1 in an unlocked position with part of a housing removed to show internal components.

To rotate the upper housing 12 relative to the lower housing 14, a force is applied to the actuation handle 78 in an effort to move the cross member 76 and upper housing 12 from engagement with the lower housing 14. The force is operable to move the cross member 76 against the bias of the spring 90 such that the upper housing 12 disengages the lock pins 92, as shown in FIG. 4. Once the upper housing 12 has been moved sufficiently by the cross member 76, the upper housing 12 will disengage the pins 92 and rotation of the upper housing 12 relative to the lower housing 14 is permitted. To rotate the upper housing 12 relative to the lower housing 14, a rotational force is applied to the upper housing 12, to thereby rotate the upper housing 12 into a desired position. Alternatively, if the cross member 76 is fixedly attached to the upper housing 12, a rotational force may be applied to the actuation handle 78 to thereby rotate the upper housing 12.

Once the upper housing 12 has been rotated into a desired position relative to the lower housing 14, the force applied to the actuation handle 78 is released, thereby causing the spring 90 to once again impart a biasing force on the cross member 76 and upper housing 12. The spring 90 causes the upper housing 12 and cross member 76 to once again move in the direction labeled A in FIG. 3. The lock pins 92 will engage one of the first or second pin apertures 64, 66 to hold the upper housing 12 relative to the lower housing 14 in the desired rotational position. As can be appreciated, whether the lock pins 92 engage the first pin aperture 64 or second pin aperture 66 depends on how far the upper housing 12 is rotated relative to the lower housing 14. In either position, the tapered surface 94 of each lock pin 92 helps to guide the lock pins 92 into the respective pin apertures 66, 68. For purposes of discussion, it will be assumed that the force applied to the upper housing 12 has rotated the upper housing 14 into a second position such that the lock pins 92 engage the second pin aperture 66. In the second position, the upper housing 12 is rotated relative to the lower housing 14 about 25 degrees such that a new position of the upper housing 12 has been achieved.

In the event that further rotation of the upper housing 12 relative to the lower housing 14 is desired, a force is once again applied to the actuation handle 78 such that the upper housing 12 disengages the lower housing 14. Once the upper housing 12 is disengaged from the lower housing 14, the upper housing 12 may be rotated into the fully dumped or fully-forward position such that the lock pins 92 engage the first pin aperture 64, thereby holding the upper housing 12 in the dumped position relative to the lower housing 14.

Figure 6:
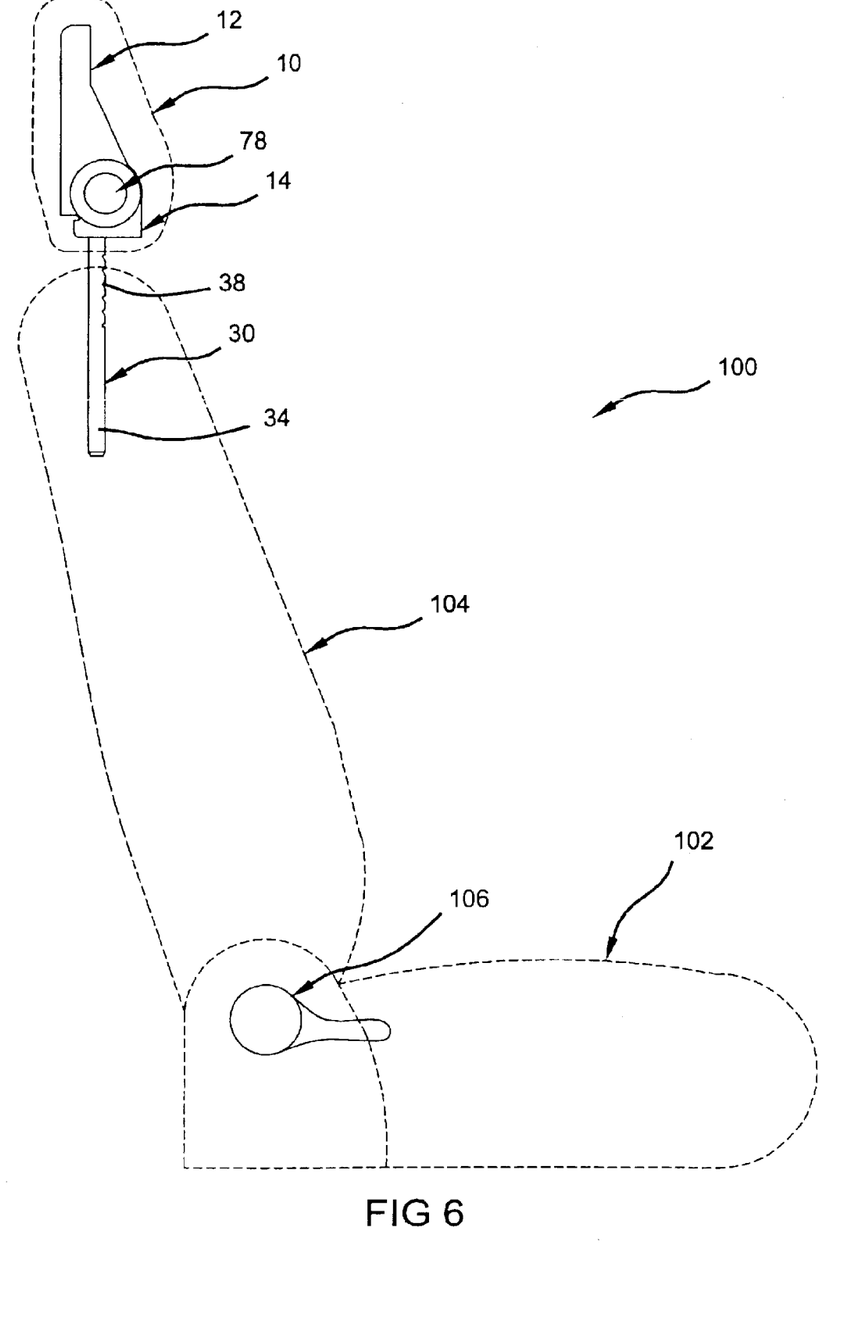
FIG. 6 is a side view of a seat assembly incorporating the headrest assembly of FIG. 1.
Figure 7:
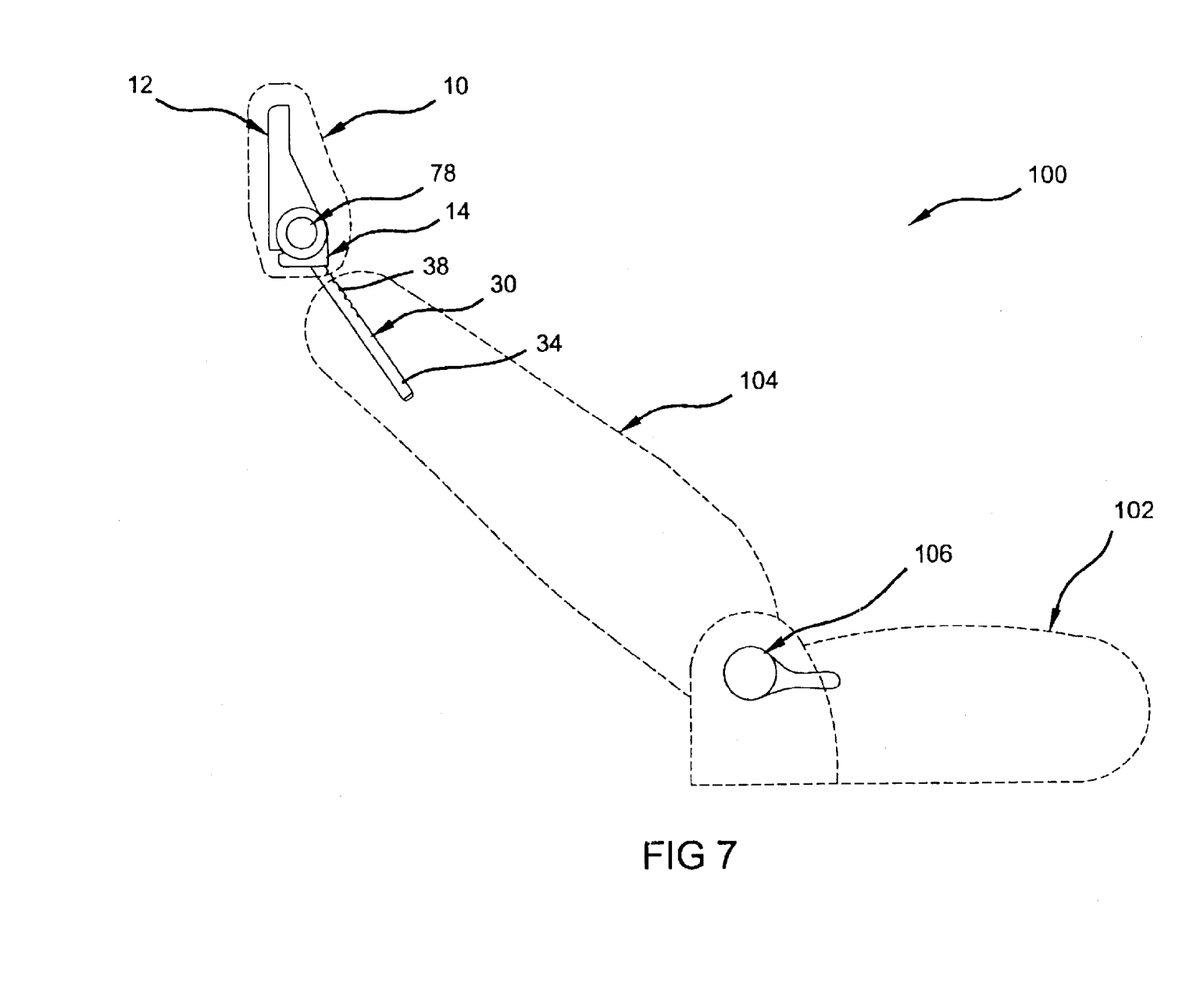
FIG. 7 is a side view of the seat assembly of FIG. 6 in a reclined position.
Figure 8:
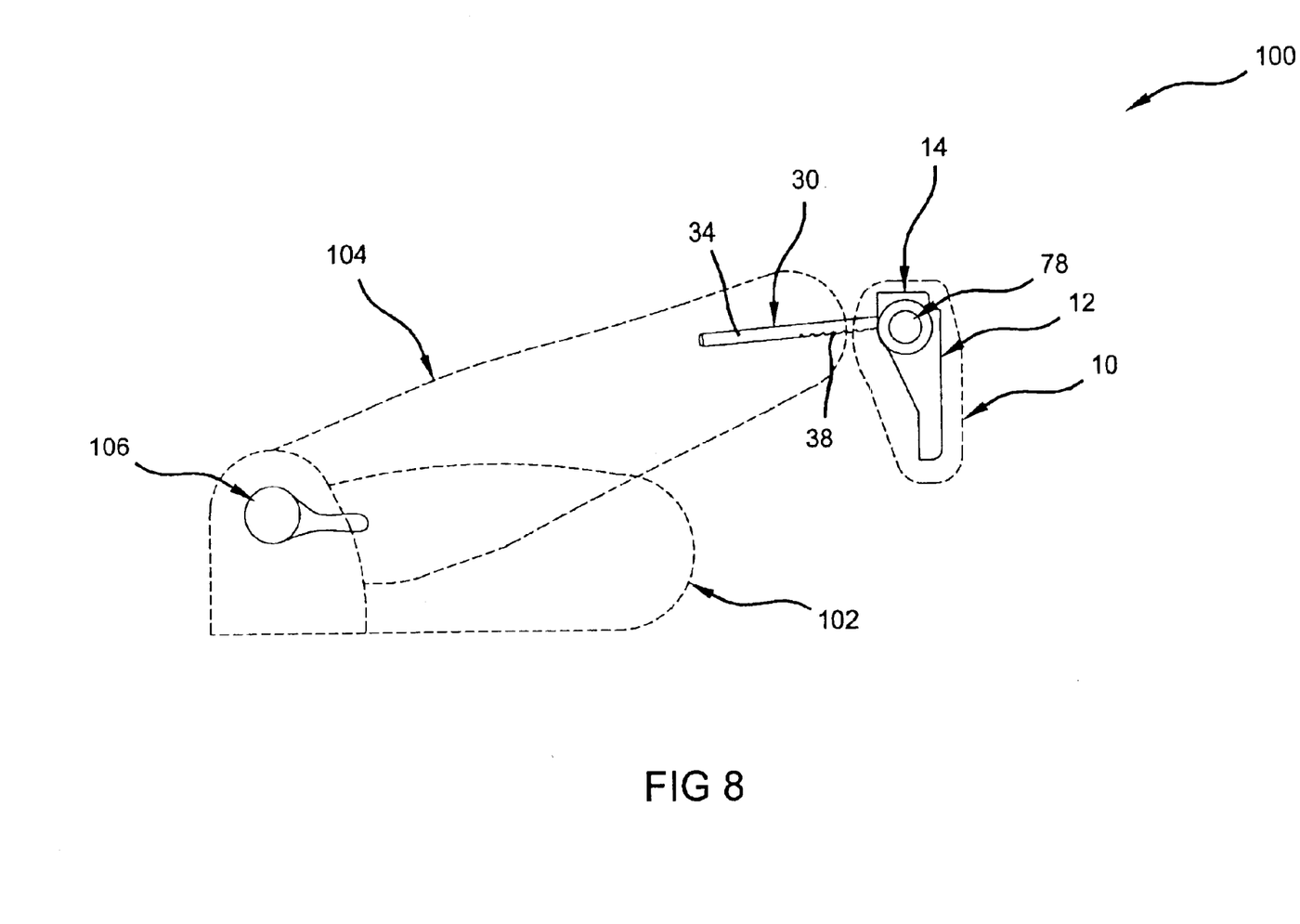
FIG. 8 is a side view of the seat assembly of FIG. 6 in a dumped or folded-flat position.

With particular reference to FIGS. 6–8, the headrest assembly 10 is shown incorporated into a vehicle seat assembly 100. The seat assembly 100 includes a seat bottom 102, a seatback 104, and a recliner mechanism 106 disposed therebetween. The recliner mechanism 106 is operable to selectively lock the seatback 104 in one of a plurality of positions relative to the seat bottom 102. As can be appreciated, once the recliner mechanism 106 is disengaged from the seatback 104, the seatback 104 is permitted to rotate relative to the seat bottom 102. Such rotation of the seatback 104 relative to the seat bottom 102 causes the angular position of the seatback 104 relative to the seat bottom 102 to change.

The headrest assembly 10 is fixedly attached to the seatback 104 generally at an opposite end from that of the recliner mechanism 106, as best shown in FIG. 6. More particularly, the legs 34 of the adjustment bar 30 are slidably received by the seatback 104 such that movement of the legs 34 relative to the seatback 104 adjusts an up and down or axial position of the headrest assembly 10 relative to the seatback 104. The headrest assembly 10 may be positioned relative to the seatback 104 due to the relationship between the notches 38 and the adjustment bar 30. In other words, each notch 38 corresponds to a different axial position of the headrest assembly 10 with respect to the vehicle seatback 104.

As the seatback is caused to recline (counterclockwise relative to the view shown in FIG. 7), the headrest assembly 10 may rotate forward (clockwise relative to the view shown in FIG. 7). A force is applied to the upper housing 12 relative to the lower housing 14, as previously discussed. Such rotation of the upper housing 12 relative to the lower housing 14 causes the headrest 10 to rotate relative to the vehicle seat 100. It should be noted that while the upper housing 12 is permitted to rotate relative to the vehicle seat 100, the lower housing 14 is restricted from rotating relative to the vehicle seat 100 due to the relationship between the adjustment bar 30 and the vehicle seatback 104.

The force applied to the actuation handle 78 disengages the upper housing 12 from the lower housing 14, thereby allowing the occupant to rotate the upper housing 12 relative to the seatback 104, as previously discussed. Such rotation of the upper housing 12 allows the relative position between the headrest 10 and a vehicle occupant to be maintained even as the seatback 104 is rotated rearward.

In addition to rearward rotation of the seatback 104, forward rotation or dumping of the seatback 104 relative to the seat bottom 102 is also provided, as shown in FIG. 8. In the event that the seatback 104 is dumped or rotated forward relative to the seat bottom 102, it is often necessary to rotate the upper housing 12 relative to the lower housing 14 such that the upper housing 12 is similarly rotated into its fully dumped articulated position. As can be appreciated, such relationship is often necessary to avoid interference between the headrest assembly 10 and other components of a vehicle.

Prior to rotating the seatback 104 into its dumped position relative to the seat bottom 102, a force is applied to the actuation handle 78 of the headrest assembly 10. Once a sufficient force is been applied to the actuation handle 78, the upper housing 12 may be rotated relative to the lower housing 14, as previously discussed. Upon sufficient rotation of the upper housing 12 relative to the lower housing 14, the lock pins 92 align with the first pin aperture 64, and the force applied to the actuation handle 78 may be released. Releasing the force from the actuation handle 78 locks the upper housing 12 in the fully dumped or articulated position relative to the lower housing 14.

To return the seatback 104 to its upright or useable position relative to the seat bottom 102, a force is applied to the recliner mechanism 106 to thereby disengage the seatback 104 from the seat bottom 102 and allow rotation of the seatback 104. Once the seatback 104 is positioned in the useable or upright position relative to the seat bottom 102, the recliner mechanism 106 engages the seatback 104 to lock the seatback in the desired position relative to the seat bottom 102.

Once the upper housing 12 is disengaged from the lower housing 14, the upper housing 12 may be repositioned into engagement with the lock pin 92. The lock pin 92 engages one of the pin apertures 66, 68 of the upper housing 12 to position the headrest assembly 10 in a usable position. As previously discussed, positioning the upper housing 12 with respect to the lower housing 14, such that the lock pin 92 engages pin aperture 66 or 68, places the headrest assembly 10 in a usable position.

The relationship between the lock pin 92 and pin apertures 66, 68 provides the occupant with the ability to adjust the headrest assembly 10 and radially position the upper housing 12 relative to the lower housing 14. In addition, the headrest assembly 10 provides the occupant with the ability to adjust the axial position of the upper and lower housings 12, 14 relative to the seatback 104. In this manner, the headrest assembly 10 provides the occupant with the ability to radially position the upper housing 12 with respect to the lower housing 14 while concurrently providing for axially adjustment of the upper and lower housings 12, 14 relative to the seatback 104 to provide the occupant with a more comfortable position of the headrest assembly 10.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A headrest assembly comprising:
   a first housing;
   a cross member rotatably supported by said first housing;
   a second housing rotatably supported by said cross member and pivotable relative said first housing;
   a spring axially biasing said second housing relative said first housing;
   an actuation handle fixedly attached to said cross member and operable to transmit an applied force to said second housing via said cross member; and
   a locking mechanism operable between a locked position and an unlocked position, said spring operable to bias said locking mechanism into said locked position, whereby said second housing is locked in one of a plurality of positions relative to said first housing, and said applied force operable to overcome the bias of said spring, whereby said second housing may be disengaged from said locked position to an unlocked position to allow said second housing to rotate relative to said first housing.

2. The headrest assembly of claim 1, further comprising an adjustment bar fixedly attached to said first housing and operable to attach the headrest assembly to an external structure.

3. The headrest assembly of claim 1, wherein said locking mechanism includes a pair of pins operable to engage said second housing in said locked position to prevent rotation of said second housing relative to said first housing and to disengage said second housing in said unlocked position to permit rotation of said second housing relative to said first housing.

4. The headrest assembly of claim 3, wherein said pins are fixedly attached to said first housing.

5. The headrest assembly of claim 3, wherein said first housing includes a plurality of apertures operable to matingly receive said pins in said locked position to position said second housing in one of an upright position, a partially reclined position, and a fully reclined position when said locking mechanism is in said locked position.

6. The headrest assembly of claim 5, wherein said partially reclined position fixes said second housing approximately at a 25 degree angle relative to said first housing.

7. The headrest assembly of claim 1, wherein said second housing includes an arcuate slot operable to guide rotation of said second housing relative to said first housing.

8. The headrest assembly of claim 7, wherein said first housing includes a guide post slidably received by said arcuate slot to define a range of motion of said second housing relative to said first housing.

9. The headrest assembly of claim 1, said actuation handle operable to transmit a rotational force to said second housing via said cross member to rotate said second housing relative to said first housing when said locking mechanism is in said unlocked position.

10. The headrest assembly of claim 1, wherein said cross member is fixedly attached to said second housing.

11. A seat assembly comprising:
   a seat bottom;
   a seatback rotatably supported by said seat bottom; and
   a headrest assembly supported by said seatback, said headrest assembly including:
      a first housing;
      a cross member fixed to said second housing and rotatably supported by said first housing;
      a second housing rotatably supported by said cross member and pivotable relative said first housing;
      a spring axially biasing said second housing relative said first housing;
      an actuation handle fixedly attached to said cross member and operable to transmit an applied force to said second housing via said cross member; and
      a locking mechanism operable between a locked position and an unlocked position, said spring operable to bias said locking mechanism into said locked position, whereby said second housing is locked in one of a plurality of positions relative to said first housing, and said applied force operable to overcome the bias of said spring, whereby said second housing may be disengaged from said locked position to an unlocked position to allow said second housing to rotate relative to said first housing.

12. The seat assembly of claim 11, further comprising an adjustment bar fixedly attached to said first housing and slidably received by said seatback to selectively position the headrest assembly in one of a plurality of positions relative to said seatback.

13. The seat assembly of claim 11, wherein said locking mechanism includes a pair of pins fixedly attached to said first housing.

14. The seat assembly of claim 13, wherein said locking mechanism includes a plurality of apertures formed in said second housing, said plurality of apertures adapted to matingly receive said pins in said locked position to lock said second housing in one of a plurality of positions relative to said first housing.

15. The seat assembly of claim 14, said actuation handle operable to transmit a rotational force to said second housing via said cross member to rotate said second housing relative to said first housing when said locking mechanism is in said unlocked position.

16. A seat assembly comprising:
   a seat bottom;
   a seatback rotatably supported by said seat bottom; and
   a headrest assembly supported by said seatback, said headrest assembly including:
      a first housing;
      a cross member;
      a second housing rotatably supported by said cross member and pivotable relative said first housing, said cross member fixedly attached to said second housing and operable to selectively move said second housing into engagement with said first housing and restrict rotation of said second housing relative to said first housing;
      a spring axially biasing said second housing relative said first housing; and
      an actuation handle fixedly attached to said cross member and operable to transmit an applied force to said second housing via said cross member.

17. The seat assembly of claim 16, wherein said first housing includes a pair of pins fixedly attached thereto.

18. The seat assembly of claim 17, wherein said second housing includes a plurality of locking apertures operable to matingly receive said pins to selectively restrict rotation of said second housing relative to said first housing.

19. The seat assembly of claim 18, wherein said pins include a tapered surface to facilitate engagement with said locking apertures.

20. The seat assembly of claim 16, wherein said second housing includes an arcuate slot.

21. The seat assembly of claim 20, wherein said first housing includes a post fixedly attached thereto, said post slidably received by said arcuate slot to define a range of motion of said second housing relative to said first housing.

22. The seat assembly of claim 16, said cross member operable to both disengage said second housing from engagement with said first housing and to rotate said second housing relative to said first housing.

23. A headrest assembly comprising:
   a first housing;
   a second housing having an arcuate slot, said arcuate slot operable to guide rotation of said second housing relative to said first housing;
   a cross member rotatably supported by said first housing; and
   a locking mechanism operable between a locked position and an unlocked position, said locking mechanism engaging said second housing in said locked position to lock said second housing in one of a plurality of positions relative to said first housing and disengaged from said second housing in said unlocked position to allow said second housing to rotate relative to said first housing.

24. The headrest assembly of claim 23, wherein said first housing includes a guide post, said guide post slidably received by said arcuate slot to define a range of motion of said second housing relative to said first housing.

25. A headrest assembly comprising:
   a first housing;
   a second housing having an arcuate slot operable to guide rotation of said second housing relative to said first housing;
   a cross member rotatably supported by said first housing; and
   a locking mechanism operable between a locked position and an unlocked position, said locking mechanism engaging said second housing in said locked position to lock said second housing in one of a plurality of positions relative to said first housing and disengaged from said second housing in said unlocked position to allow said second housing to rotate relative to said first housing.

26. The seat assembly of claim 25, wherein said first housing includes a post fixedly attached thereto, said post slidably received by said arcuate slot to define a range of motion of said housing relative to said first housing.

* * * * *

UNITED STATES PATENT AND TRADEMARK OFFICE
CERTIFICATE OF CORRECTION

PATENT NO. : 6,880,890 B1
DATED : April 19, 2005
INVENTOR(S) : Sandra M. DeBrabant It is certified that error appears in the above-identified patent and that said Letters Patent is hereby corrected as shown below:

<u>Column 10,</u>
Line 65, after "said" (first occurrence) insert -- second --.

Signed and Sealed this

Sixteenth Day of August, 2005

JON W. DUDAS
*Director of the United States Patent and Trademark Office*